(No Model.)
W. E. FOREST.
MUSCLE ROLLER.
No. 472,572. Patented Apr. 12, 1892.
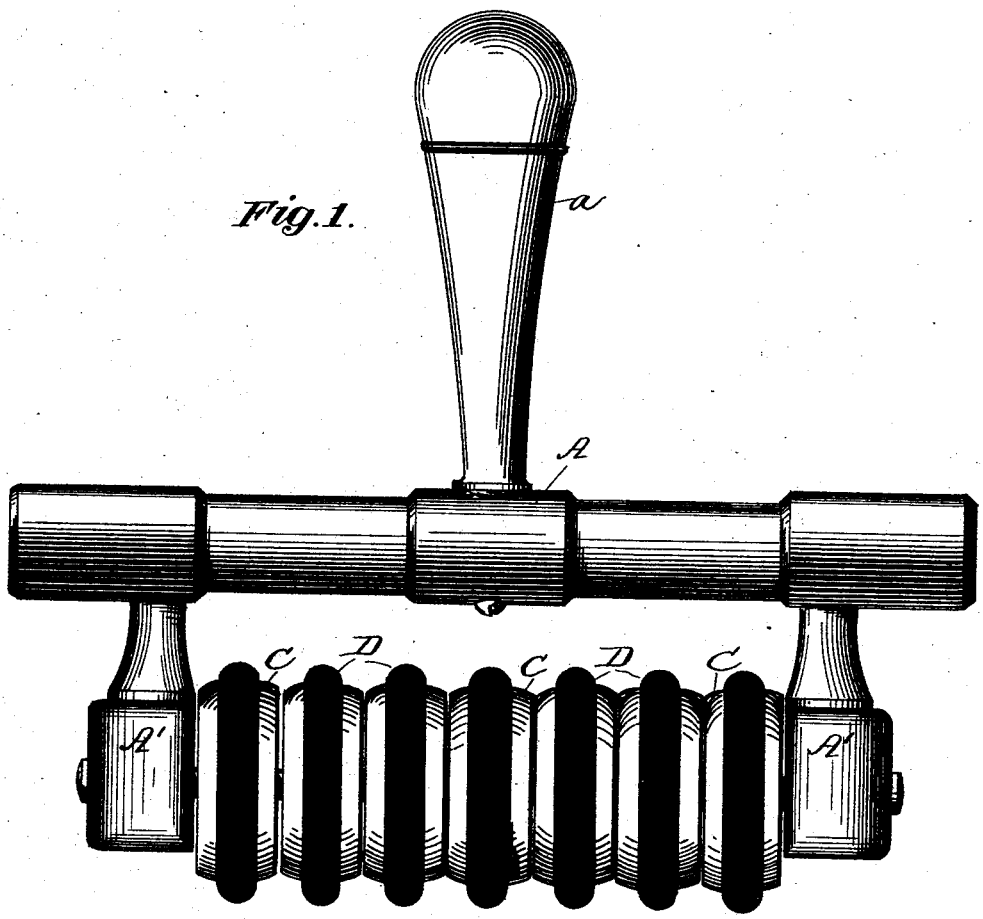
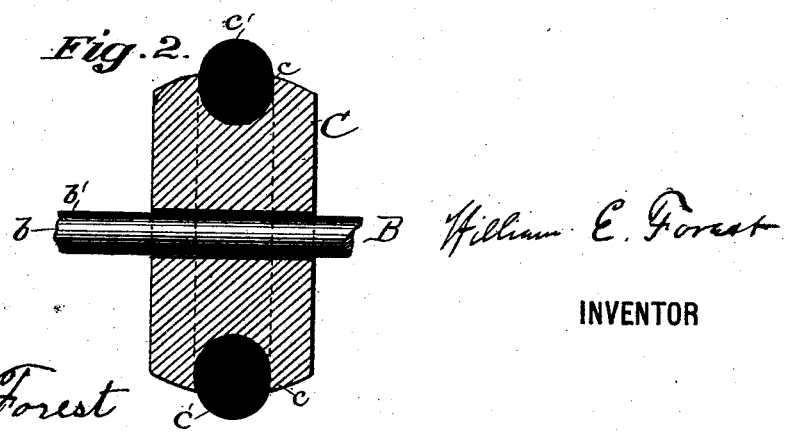
WITNESSES:
INVENTOR

UNITED STATES PATENT OFFICE.

WILLIAM E. FOREST, OF NEW YORK, N. Y.

MUSCLE-ROLLER.

SPECIFICATION forming part of Letters Patent No. 472,572, dated April 12, 1892.

Application filed January 28, 1891. Serial No. 379,477. (No model.)

*To all whom it may concern:*

Be it known that I, WILLIAM E. FOREST, of New York city, in the county and State of New York, have invented a new and useful Improved Muscle or Health Roller, of which the following is a specification.

No similar device or instrument has been patented in this or any other country, so far as I am aware.

The object of this invention is to apply rapid intermitting pressure to any and every part of the body, and to thus bring about the same results with the instrument as is accomplished by hand manipulation of the professional masseurs and others. In short, the instrument is to be used in applying "massage," so called, both for the cure of disease and for the preservation of good health.

Reference is had to the annexed drawings, forming a part thereof, in which—

Figure 1 is a perspective view of my improved muscle and health roller. Fig. 2 is a sectional view of wheel and elastic axle.

Similar letters of reference indicate corresponding parts in both the views.

My invention consists in the combination of a frame-work supplied with a handle, a flexible axle consisting of a tempered steel rod in the center surrounded with an elastic rubber buffer. Running on this elastic steel and rubber axle is a series of wheels, from two up to six or more, side by side, in close apposition. Within a groove in the center of the outer rim of each wheel is a round rubber ring, narrower than the wheel, so arranged that about half of the ring is in the groove and the rest projects beyond the rim of the wheel. The object of the flexible tempered steel axle, covered with soft rubber, is to permit its being easily bent, and thus permit the wheels to accommodate themselves to the inequalities of the surface of the body, while the elastic rubber cover of the axle acts as an elastic buffer to prevent the wheels bruising the flesh. The rubber ring on the outer rim of the wheels acts as an elastic pad and prevents injury or pain to the parts on which the instrument is applied, as this elastic pad alone comes in contact with the skin. The object of having the ring narrower than the wheel is to thus cause intervals between the rings, into which the flesh is crowded up between the rings, and thus becomes subject to lateral as well as perpendicular pressure. The frame-work A and A', which supports the flexible axle B, is supplied with a handle *a*. Through each end of the frame-work A' is a hole for the ends of the elastic axle B. The axle B consists of a central tempered steel rod *b*, surrounded with a buffer *b'*, the whole making a flexible and elastic axle. The wheel C is of wood, with a groove *c* in its outer rim, in which groove is a solid elastic rubber ring *c'*. There is a series of these wheels on the flexible and elastic axle B.

Having thus described my invention, I claim as new and desire to secure by Letters Patent—

1. In a muscle and health roller, the combination, with the frame-work A and A', of a flexible and elastic steel and rubber axle B and a series of wooden wheels C C.

2. In a muscle and health roller, a frame-work A and A', a flexible and elastic axle B, a series of wheels C C, and rubber rings in a groove in the rim of each wheel *c c'*, these rings so arranged as to make an interval D between each rubber ring.

WILLIAM E. FOREST.

Witnesses:
C. L. FOREST,
EMILIE RIGOULOT.